United States Patent
McCarthy et al.

(10) Patent No.: US 6,760,844 B1
(45) Date of Patent: Jul. 6, 2004

(54) SECURE TRANSACTIONS SESSIONS

(75) Inventors: Thomas E. McCarthy, Arden Hills, MN (US); Wayne J. LeBlanc, Centerville, MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/365,594

(22) Filed: Jul. 30, 1999

(51) Int. Cl.$^7$ ............................................. G06F 15/16
(52) U.S. Cl. ....................... 713/201; 713/155; 709/203; 709/227
(58) Field of Search ................................ 709/203, 227; 713/155

(56) References Cited

U.S. PATENT DOCUMENTS

| | | | | |
|---|---|---|---|---|
| 5,586,312 A | * | 12/1996 | Johnson et al. ................ | 707/10 |
| 5,754,772 A | * | 5/1998 | Leaf ............................. | 709/203 |
| 5,890,175 A | * | 3/1999 | Wong et al. .................. | 715/505 |
| 6,058,378 A | * | 5/2000 | Clark et al. ................... | 705/37 |
| 6,115,744 A | * | 9/2000 | Robins et al. ................ | 709/227 |
| 6,205,482 B1 | * | 3/2001 | Navarre et al. ............... | 709/227 |
| 6,219,790 B1 | * | 4/2001 | Lloyd et al. .................. | 713/201 |
| 6,321,251 B1 | * | 11/2001 | Deisinger et al. ............ | 709/203 |
| 6,704,779 B1 | * | 3/2004 | Germscheid et al. ......... | 709/223 |
| 2002/0046294 A1 | * | 4/2002 | Brodsky et al. .............. | 709/246 |

OTHER PUBLICATIONS

Tyler, T.W. et al, "Using Distributed OLTP Technology in a High Performance Storage System", 1994, IBM, entire documen.*
Bruce et al, "Security in Distributed Computing", 1997, Prentice Hall PTR, pp. 295–313.*
HP, "HP–UX 10.20 operating system", Hewlett–Packard Development Co., L.P., 2004, web page http://www.hp.com/cgi–bin/pf–new.cgi?N=referer , entire document.*
Toulemonde, Christophe, et al, "From Client/Server to Network Computing a Migration to Domino", IBM, Aug. 1998, first edition, entire document.*
Renzel, Klaus, et al, "Client/Server Architectures for Business Information Systems", sd&m GmbH & Co. KG, Project ARCUS, 1997, entire document.*

* cited by examiner

Primary Examiner—Ayaz Sheikh
Assistant Examiner—Ronald Baum
(74) Attorney, Agent, or Firm—Charles A. Johnson; Mark T. Starr; Nawrocki, Rooney & Sivertson, P.A.

(57) ABSTRACT

A system and method which allows the secure interchange of information a web browser based user system and an On-Line Transaction Processing (OLTP) enterprise server. In addition to the standards based security provided by the browser for individual data transfers, a facility enables a user to log-on to an entire transactional session. This facility provides for validation of user-id and user password.

15 Claims, 7 Drawing Sheets

SECURE TRANSACTIONS SESSIONS

CROSS REFERENCE TO CO-PENDING APPLICATIONS

The present application is related to U.S. patent application Ser. No. 09/164,759, filed Oct. 1, 1998, entitled "A COMMON GATEWAY WHICH ALLOWS APPLETS TO MAKE PROGRAM CALLS TO OLTP APPLICATIONS EXECUTING ON AN ENTERPRISE SERVER" now U.S. Pat. No. 6,397,220; U.S. patent application Ser. No. 09/164,932, filed Oct. 1, 1998, entitled "A MULTI-CLIENT USER CUSTOMIZED DCOM GATEWAY FOR AN OLTP ENTERPRISE SERVER APPLICATION"; and U.S. patent application Ser. No. 09/164,822, filed Oct. 1, 1998, entitled "MAKING CGI VARIABLES AND COOKIE INFORMATION AVAILABLE TO AN OLTP SYSTEM"; which are assigned to the assignee of the present invention.

BACKGROUND OF THE INVENTION

1. Field of the Invention

The present invention relates to a security system for validating Web-Based requests, and more specifically, to a security system whereby web browser users can interact with transaction applications implemented using an incompatible security technique.

2. Description of the Prior Art

The methods by which companies conduct business with their customers are undergoing fundamental changes, due in large part to World Wide Web technology. In addition, the same technology that makes a company accessible to the world, may be used on internal company networks for conducting operational and administrative tasks.

One of the technologies underlying the World Wide Web is the web browser. Web browsers have become a de facto user interface standard because of their ability to interpret and display information having standard formats (e.g., HyperText Markup Language (HTML), standard test, GIF, etc.). Client software programs, popularly referred to as web browsers (e.g., Mosaic, Netscape Navigator, Microsoft Internet Explorer, etc.), execute on client systems and issue requests to server systems. The server systems typically execute HyperText Transport Protocol (HTTP) server programs which process requests from the web browsers and deliver data to them. The system that executes an HTTP server program and returns data to the web browser will hereinafter be referred to as a Web Server System. An HTTP server program itself will be referred to as a web server.

A Web Server System has access to on-line documents that contain data written in HyperText Markup Language (HTML). The HTML documents contain display parameters, capable of interpretation by a web browser, and references to other HTML documents and web servers (source: World Wide Web: Beneath the Surf, from UCL Press, by Mark Handley and Jon Crowcroft, on-line at http://www.cs.ucl.ac.uk/staff/jon/book/book.html).

As web browsers are making their mark as a "standard" user interface, many businesses have a wealth of information that is managed by prior art data base management systems such as DMS, RDMS, DB2, Oracle, Ingres, Sybase, Informix, and many others. In addition, many of the database management systems are available as resources in a larger transaction processing system. There are also mission critical applications which still reside on enterprise servers, since these type of systems have resiliency and recovery features historically not available on other smaller types of servers.

One key to the future success of a business may lie in its ability to capitalize on the growing prevalence of web browsers in combination with selectively providing access to the data that is stored in its databases. Common Gateway Interface (CGI) programs are used to provide web browser access to such databases.

The Common Gateway Interface (CGI) is a standard for interfacing external applications, such as web browsers, to obtain information from information servers, such as web servers. The CGI allows programs (CGI programs) to be referenced by a web browser and executed on the Web Server System. For example, to make a UNIX database accessible via the World Wide Web, a CGI program is executed on the Web Server System to: 1) transmit information to the database engine; 2) receive the results from the database engine; and 3) format the data in an HTML document which is returned to the web browser. CGI variables typically include information such as the IP address of the browser, or the port number of the server.

Often associated with CGI Variables, cookies are packets of information which may be sent back to a user system after the user accesses a web site. These packets of information indicate how a user utilized various functions associated with the site. This information will be stored on the user system along with the Uniform Resource Locator (URL) for the web site, and the information is passed back to the server if the user accesses the web site again.

Server software uses the user history provided by the cookies to make decisions regarding how the user request is to be handled. For example, assume the web site involves history. The cookie information will inform the server that the current request is from a user interested in the Civil War. This allows the server to provide the user with advertisements on books related to the Civil War.

There is a growing need for greater assurances that information being passed along the Internet is secure and will not be intercepted. Some of the problems involved with Internet hacking include stolen access, stolen resources, email counterfeiting, vandalization, and Internet agents (worms) (source: Matteo Foschetti, Internet Security, California State University, Fullerton, April 1996, available on-line at: http://www.ecs.fullerton.edu/~foschett/security.html). Many consumers have the general perception that transacting business on the Internet is not safe, thus they are reluctant to participate in Internet activities such as online shopping, sending messages, submitting to newsgroups, or web surfing. Although some people's perception of Internet security breaches may be somewhat overblown, figures do prove the vulnerability of the Internet. It has been estimated that over 80% of all computer crimes take place using the Internet. With over 30,000 interconnected networks and 4.8 million attached computers including over 30 million users, there is a legitimate Internet security concern.

Businesses are faced with the challenge of adapting their present usage of yesterday's technology to new opportunities that are made available with the World Wide Web. Most business application software and underlying databases are not equipped to handle interaction with web browsers. It would therefore be desirable to have a secure, flexible and efficient means for allowing interoperability between enterprise-based business application software and the World Wide Web. Unfortunately, because many of the existing commercial data base systems were implemented before the internet, they often times have different and incompatible security approaches from those utilized by commercially available web browsers.

SUMMARY OF THE INVENTION

The present invention overcomes many of the disadvantages associated with the prior art by providing a system and method which allows the secure interchange of transaction information between a web browser user employing a first security approach and an existing On-Line Transaction Processing (OLTP) enterprise server employing a second security approach. Previously, it was necessary to conform the web browser and enterprise server security systems, or conduct only unprotected and non-secure transactions.

Many existing OLTP systems have security systems with closed and application imbedded security logic. These techniques developed in an era in which user terminals tended to lack the processing capability to actively participate in the security effort. However, current web based systems have basic user terminals which are personal computers having substantial processing capability. As a result, open and terminal intensive security systems have become the norm.

As a result of the need to add security provisions to web based applications and the availability of user terminal processing capability, the current commercial browsers (e.g., Microsoft Internet Explorer, Netscape Navigator, etc.) have been equipped with Secure Socket Layer (SSL) and other standardized security techniques. These standardized approaches are most concerned with providing security for each individual data transfer. Wherein as this type of security is important, it is primarily directed to web information gathering activities.

Many typical existing applications on the OLTP enterprise servers involve transaction sessions. These require a user to "sign-on" with a user-id and password. The purpose of this sign-on is to identify the user and the user's level of access to the OLTP enterprise server. Following validation of the user-id and password, the user typically interacts with the OLTP enterprise server over a period of time during which numerous data transmissions are made in both directions.

In accordance with the preferred mode of the present invention, the facility is provided to ensure security for each session and each individual data transmission within each session. This is accomplished by providing an overall security environment in which each individual data transmission is protected by the standards based security system of the commercial web browser. Simultaneously, session security is maintained through the use of the enhanced security protocol of the present invention. Sign-in and sign-off is performed over the internet from the web browser. Each individual transaction within the session is separately checked to ensure that it communication with the validated user-id and password of the session user.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 8 is a listing of the log-on script.

DETAILED DESCRIPTION OF THE PREFERRED EMBODIMENTS

The detailed descriptions which follow are presented largely in terms of algorithms and symbolic representations of operations on data bits within a computer memory. These algorithmic descriptions and representations are the means used by those skilled in the data processing arts to most effectively convey the substance of their work to others skilled in the art.

An algorithm is here, generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers or the like. It should be kept in mind, however, that all of these and similar terms are to be associated with the appropriate physical quantities and are merely convenient labels applied to these quantities.

Furthermore, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases, it should be kept in mind the distinction between the method operations in operating a computer and the method of computation itself. The present invention related to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms present herein are not inherently related to a particular computer system or other apparatus. In particular, various general purpose computer systems may be used with computer programs written in accordance with the teachings of the present invention, or it may prove more convenient to construct more specialized apparatus, to perform the required method steps. The required structure for such machines will be apparent from the description given below.

Figure 1:
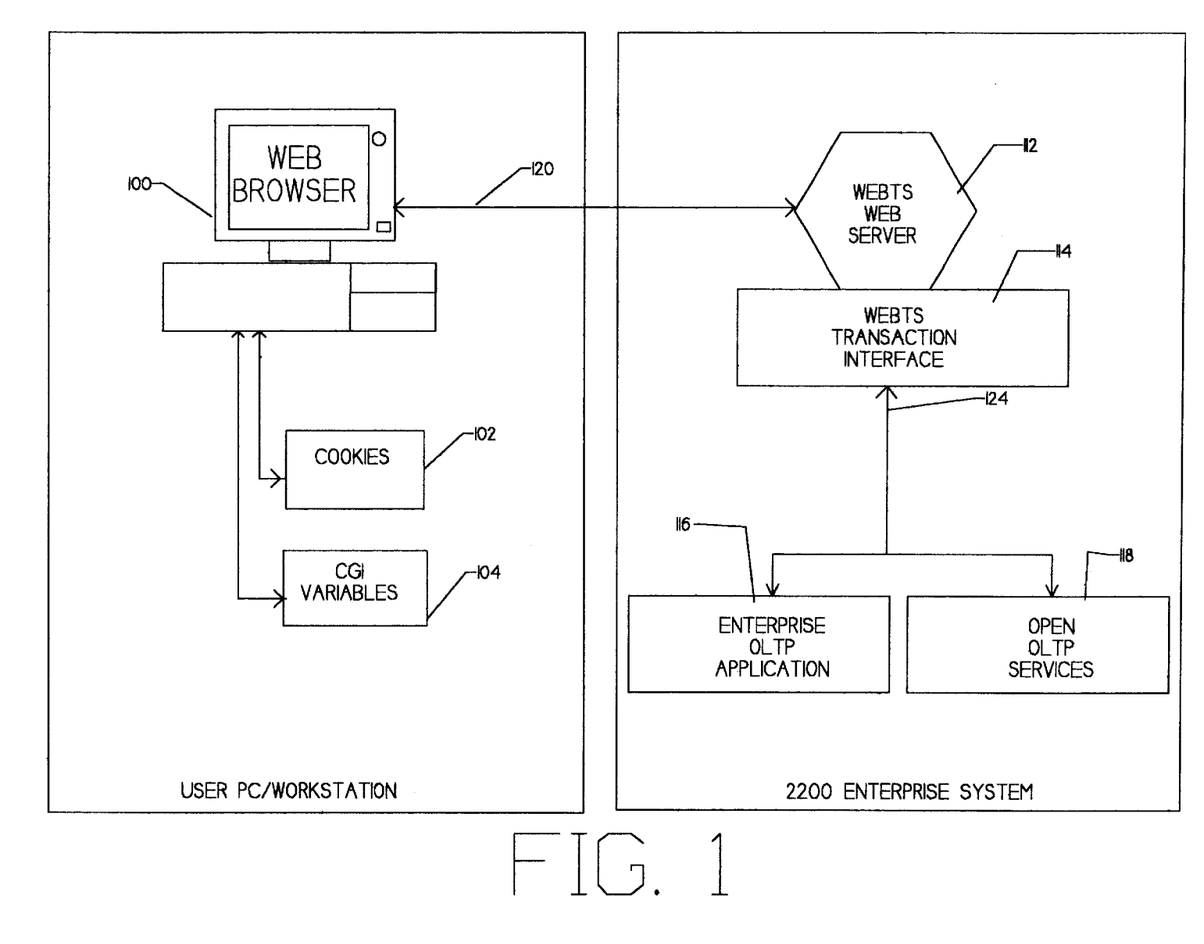
FIG. 1 is generalized block diagram of components utilized by the current invention, including a step-by-step illustration of a transaction as it proceeds through the components of the system.

FIG. 1 is a generalized block diagram of components utilized by the current invention, including a step-by-step illustration of a web transaction request as it proceeds through the components of the system.

Web browser 100 (note that most systems will have a number of terminals; only one is shown for simplicity) is the primary tool for viewing the contents of information repositories on the World Wide Web. By further definition, a web browser 100 is a tool (software application) used to view the contents of an item packaged in a format requiring decoding, deciphering or decryption. Web browser 100 reads and displays web pages. Web pages are merely text based characters arranged in a manner such that background and foreground colors, fonts (styles of characters), and images are transformed into the results of the intended web page. Thus, it is the job of the web browser 100 to interpret the HTML (arranged text characters) into the colors, fonts, and images that are presented to a user when accessing a web page. Examples of popular, commercial web browsers include "Navigator" from Netscape Corporation, and "Internet Explorer" from Microsoft Corporation.

When a user accesses a web site, web browser 100 retrieves Cookie Information from an enterprise-based OLTP server. Cookies are packets of information which may be sent back to a user system after a user accesses a web site. These packets of information usually indicate how the user utilized various functions associated with the site. Cookie information is stored on the user system (in Cookie repository 102), along with the Uniform Resource Locator (URL) for the web site, and is passed back to the Web OLTP server if the user accesses the web site (appropriate range of URLs) again. Application software on the Web OLTP server can use the user history provided by the Cookies 102 to make decisions regarding how the user request is to be handled.

CGI Variables 104 are also used to pass information between a user system (web browser) 100 and the web server. These CGI variables can include user entered data or pre-initialized data hidden in the HTML page sent to the browser to solicit the user input. CGI variables are passed to the web server when a web based transaction is called. The web server passes these CGI parameters on as input to the application transaction for its interpretation and use.

A transaction is a complete unit of work that maintains the ACID properties (atomicity, consistency, isolation, and durability) for the work it performs. Typically a transaction updates one or more databases. In distributed transaction processing (DTP), a transaction can include multiple units of work performed on one or more systems.

The Web browser communicates via standard HTTP protocol to the WebTS OLTP web server 112, on the 2200 Enterprise system. In addition to typical web page delivery and CGI transaction support, this server provides a high performance transaction interface 114 which allows calling transactions originally created as the 2200 legacy enterprise transaction environment 116. This transaction interface also is capable of calling transactions implemented according to the X/OPEN OLTP interface standard via the Open OLTP Services program 118.

Complex business transactions usually require a sequence of transactions which vary depending on the specific task being performed. It is common for a given transaction to only perform one step of the task, and the next step may require the output of the first task as well as additional input from the user. Sometimes the output of one transaction forms the input screen for another transaction, but there can be intervening requests for fixed HTML, pages or even calls to transactions of other applications, taking place before a subsequent return call to a transaction in the subject application.

This presents a problem for Web based transactions because each one is executed without any knowledge of each other. Web servers do not retain any information about a request after the response. Web applications typically get around this problem by using Cookies and/or hidden CGI parameters to pass task data from one transaction to the next.

This does not map well with existing mainframe transaction systems which utilize user session concepts, which remember a requestor over an extended period of time and make session related application data available to subsequent transactions submitted by the same user. Such applications can be rewritten to use cookies and hidden CGI variables, but his is often cost prohibitive. In addition, enterprise level applications have high security requirements in terms of recognizing users and protecting system data and data of other users and applications from compromise. The security protections provided on these systems are usually session oriented authenticating a user at first entrance to the application and assigning security rights, privileges, and restrictions to the individual user session.

While standard web browsers and servers provide the Secure Socket Layer feature, this only provides for encrypting traffic over the network and authenticating the browser and server interfaces. This invention builds on this web server technology, adding mechanisms to set-up and enforce the enterprise transaction security environment for any arbitrary series of transactions initiated from the same browser. This mechanism also provides for transparent preservation of enterprise system resident application data between transactions.

The invention is implemented in the WebTS WEB SERVER 112 and WebTS Transaction Interface 114 components in conjunction with the 2200 Enterprise System operating system. See FIG. 2 for a more detailed description of the functions of these components.

Figure 2:
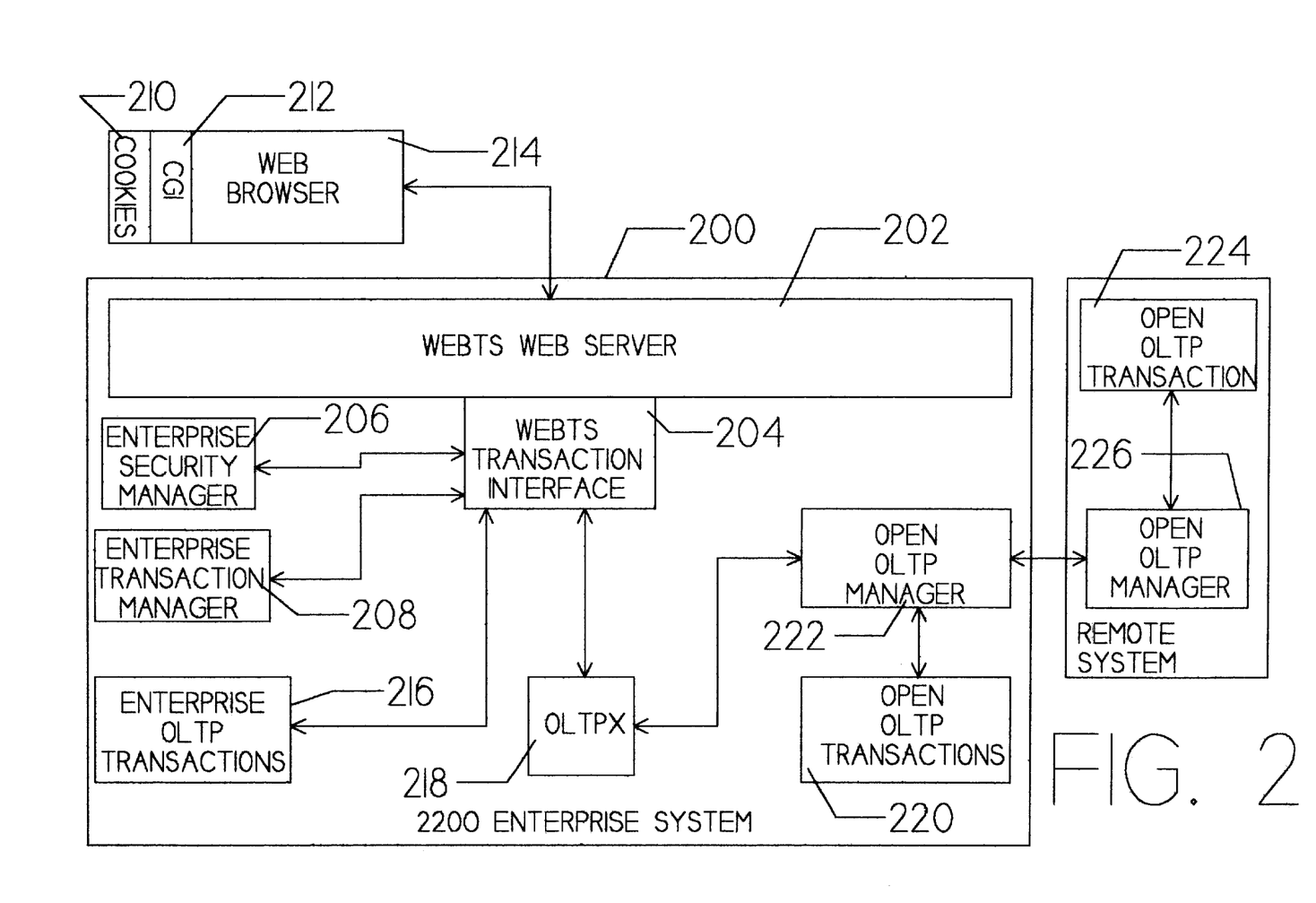
FIG. 2 is a functional block diagram of the computing environment in which the present invention resides.

FIG. 2 is a more detailed diagram of the WebTS Server and its components. Also shown for exposition purposes are the WEB BROWSER 214, Cookie 210, and CGI 212 items, representing a simplified picture of components similar to those shown in FIG. 1 as WEB BROWSER 100, COOKIES 102, AND CGI VARIABLES 104.

The WebTS Web Server 202 and the WebTS Transaction Interface 204, in conjunction with other system components, support a special function referred to as an Enterprise Secure Session. In order to initiate this session, the user must submit acceptable credentials via a special psuedo-transaction call supported by the WebTS Server. These credentials, passed as CGI parameters, are intercepted by the server and decoded for processing by the Enterprise Security Manager 206 for validation. If the credentials are accepted, the WebTS transaction interface creates a security state vector and encapsulates it in a special Cookie which is sent back to the browser with the Enterprise Secure Session successful open Message. Calls to subsequent application transactions transparently carry this cookie back to the WebTS server which strips off the special Enter-rise Secure Session cookie and passes it to the WebTS transaction interface which directs the Enterprise Transaction Manager 208 to execute the Enterprise OLTP Transaction 216 in the proper security environment for the previously supplied credentials. This process is repeated for each transaction submitted by this specific browser until a special session closing psuedo-transaction is sent.

This invention employs a variety of security techniques to ensure that the Enterprise Secure Session is available only to the specific browser that initiated the session. It also provides session time outs and application originated session closures to provide additional security tailored to the application.

The special credential Cookie is handled separately from the standard web Cookie so that the executing application need not know of its existence. The Enterprise Secure Session looks to the transaction just like the normal highly secure operating environment supported for the legacy non-intelligent terminal interfaces. The standard web cookies are passed to the transactions so that they can be used in the conventional manner for application information storage on the browser.

This mechanism is also implemented such that it can be used by new transaction based applications in the traditional Enterprise transaction environment. The Enterprise Security environment can be used as a protective wall around these applications securely limiting the transactions access to data and system functions to that required to support the application. This mechanism can also support industry standard environments like X/OPEN OLTP. For example, the WebTS Transaction interface can also call the Open OLTP Manager 222, which controls X/OPEN OLTP style transactions via a special OLTPX component 218. WebTS passes through all of the security information necessary for this system to control Open OLTP Transactions 220 on the Enterprise System or Open OLTP Transactions 224 ON remote systems via distributed Open OLTP Managers 226.

As an illustrative example of a transaction, consider a stock broker application wherein the user of a browser has special access to transactions based on personal identity. The user starts working at the personal terminal in the morning and then uses it continuously for hours, perhaps all day, entering individual buy and sell transactions and accessing sensitive data about the securities involved. This is a mission critical application which has been built up over many years on a large centralized computer system. Using this invention, this application has been successfully adapted to a web interface without having to change the logical structure of the transactions or the enterprise security environment in which it operates.

The broker fills out a screen on the browser 214 entering a unique identifier and transmits the screen to the WebTS web server 202. The identification information is passed using CGI 212 and is used as described in the FIG. 2 component description above to ensure that the broker has authorization from the Enterprise Security Manager 206. When the user's identity is validated, a corresponding specific enterprise security profile is established and identifying information is passed back via a cookie structure. The browser user is presented with an initial transaction screen displaying the functions that are permitted for the assigned security profile. On subsequent calls to any application transactions, the specific Enterprise Security profile is invoked and enforced on any file and privilege interface accesses. The transactions themselves appear transparent to the new environment and utilize the same file access mechanisms and privilege interfaces as before, thus receiving the same acknowledgments and error messages as before. There is no need for any coding change to maintain the same high level of security isolation that existed in the previous environment. This also means that any security implemented by the application level which is based on the Enterprise Security identity mechanisms will continue to function unchanged.

As an example, the broker could fill out a request to purchase stock for a particular customer. Application level security might only allow the broker to execute the purchase if the broker was in its list of personnel allowed to execute stock trades. Enterprise level security would add further control by only giving the transaction actual file access to the stockholder accounts while screening out access to files containing real time trading information resident on the same computing system. All of this would be automatically and transparently keyed to the credentials submitted one time when the broker first sat down at the browser terminal.

When the broker is finished with the work day, a simple Enterprise Security closure request is sent to the web server and then to the WebTS Transaction interface which directs the Enterprise Security Manager to close out the broker's profile, removing all privileges, and preventing any future use until credentials are resubmitted.

Figure 3:
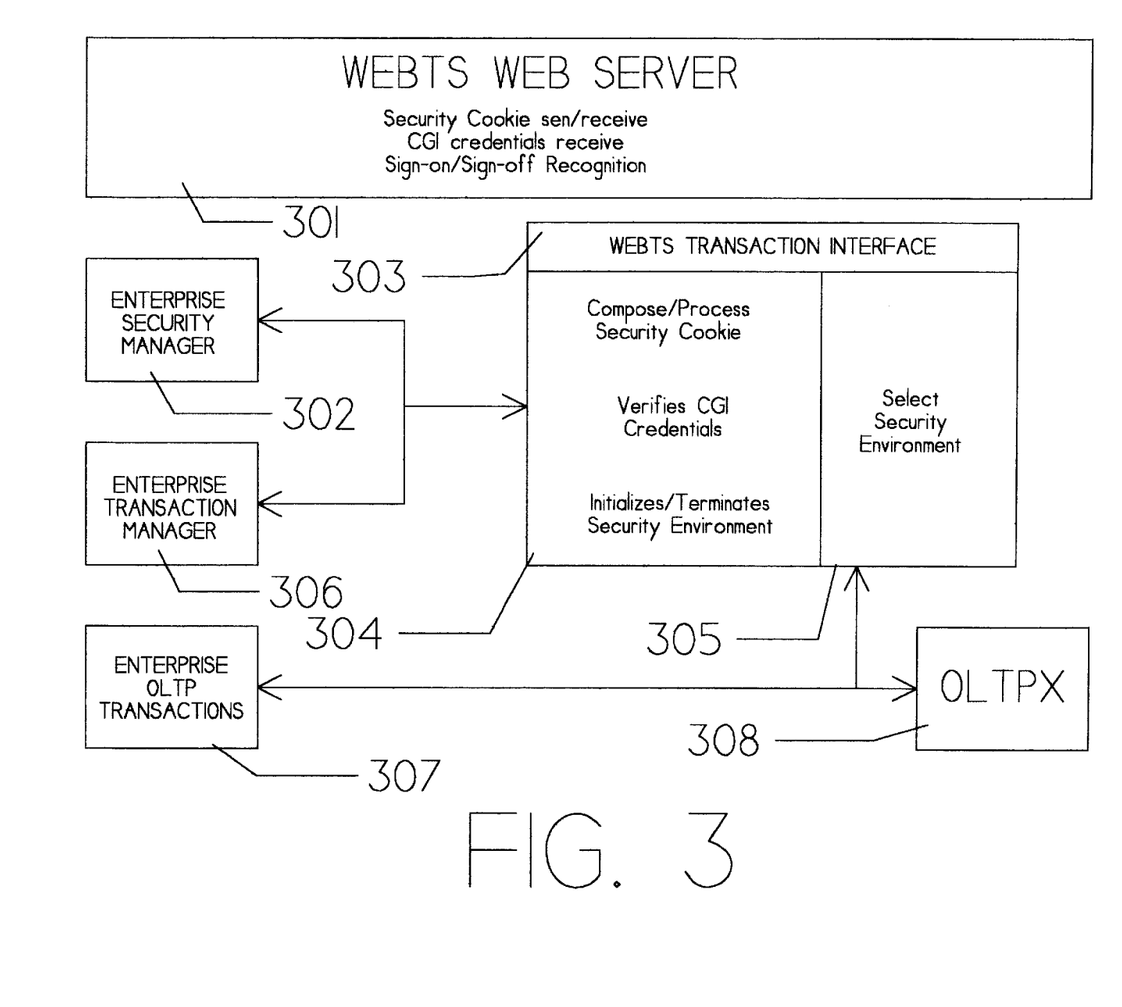
FIG. 3 is a block diagram showing flow through the components of the computing environment.

FIG. 3 provides a functional view of Enterprise Secure Session processing. The special sign-on and sign-off functions are recognized in the WebTS Web Server 301 area of the system. The CGI credentials are extracted and passed on to the initialization portion 304 of the WebTS Transaction Interface 303 for further processing. At sign-on request time, this interface interacts with the Enterprise Security Manager 302 and the Enterprise Transaction Manager 306 to verify credentials and initialize the environment. The Interface also composes the special Security cookie and passes it back to the Web Server for shipment to the browser. At sign-off time this, WebTS Transaction Interface interacts with the Enterprise Security Manager to revoke the security and terminate all privileges to effectively close the session.

Application request, the WebTS Web Server passes Security Cookies to the security session operational portion 305 of the WebTS Transaction Interface which selects the appropriate Security environment and runs the Enterprise OLTP TRANSACTIONS 307 or OLTPX Transaction 308.

Figure 4:
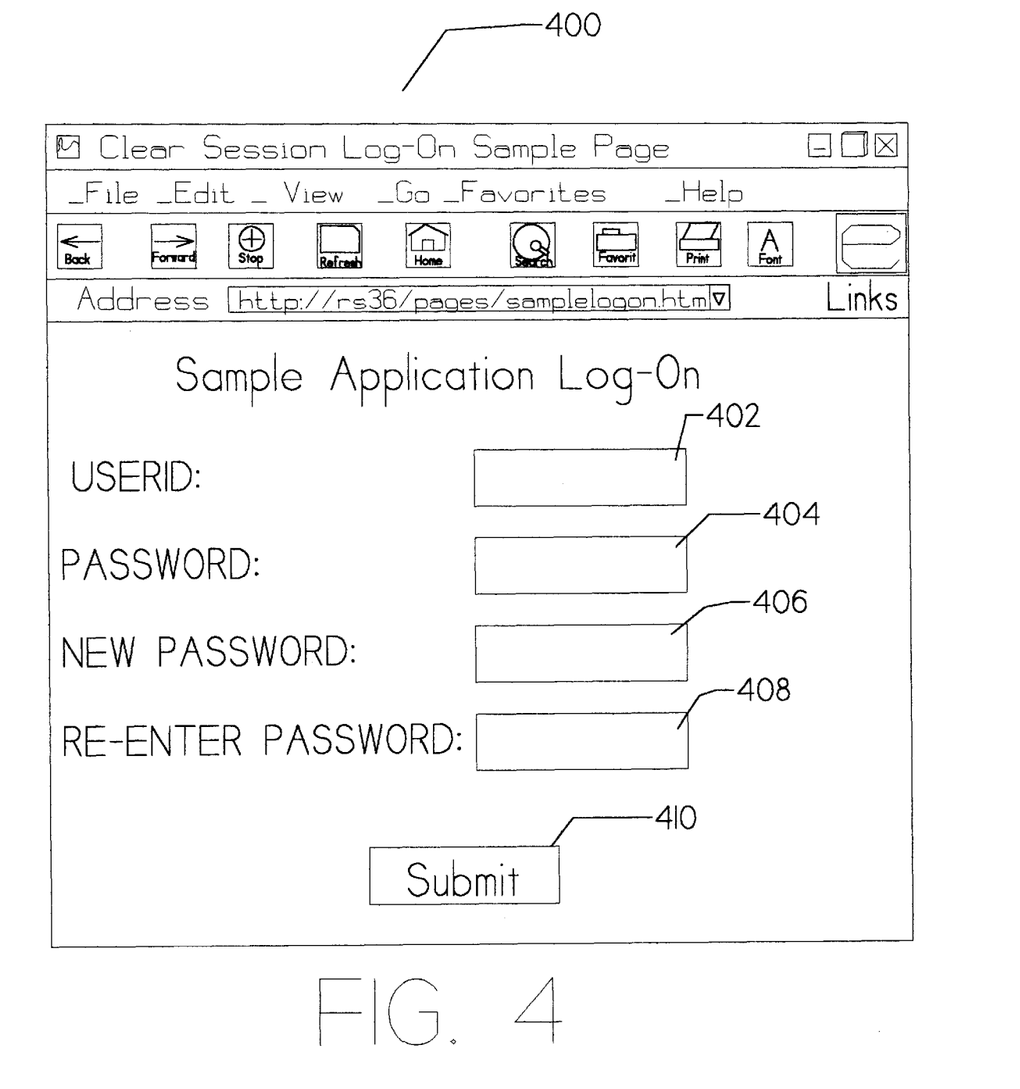
FIG. 4 is a view of the log-on window.

FIG. 4 is a view 400 of the window utilized by the present invention to facilitate user log-on. The user must enter his/her user-id in variable box 402. This user-id is unique to an individual user. In the ideal situation the user-id is assigned once and the user continues to uniquely use that same user-id for an entire career, for example.

The user also enters a password in variable box 404. Again, preferably the user password is unique to the individual user. Unlike the user-id, the user password should be frequently and periodically changed to prevent security compromise. The combination of the user-id and the user password, uniquely identifies a given user to the accessed application within the OLTP enterprise server.

A user password is not ordinarily changed with each access to the system. However, when the user does want to change a password, the new password is entered into variable box 406 and again into variable box 408. Entering the new password twice helps the user to remember the new password.

After a user has entered the required data, button 410 is depressed to transmit these data to the OLTP enterprise server. Assuming that these data can be properly validated by the application within the OLTP enterprise server, the user is notified that the requested session can begin.

Figure 5:
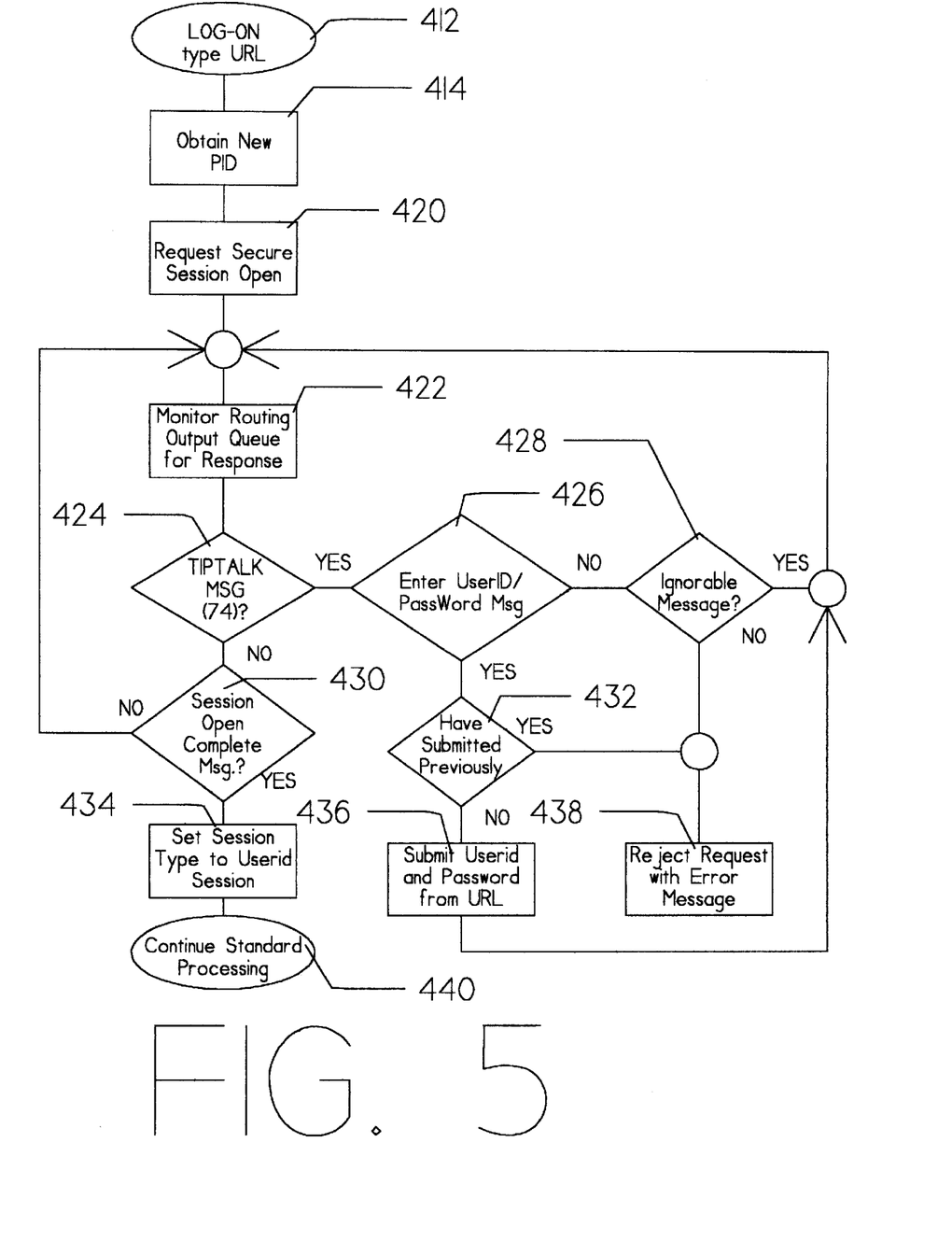
FIG. 5 is a flowchart showing the log-on process of the present invention.

FIG. 5 is a flow chart showing the operation of the log-on process. This facility is provided for the enterprise server application to permit initial user log-on. The routine is entered at element 412. This occurs when the data from window 400 (see also FIG. 4) is received by the OLTP enterprise server. Element 414 begins the process by obtaining the user-id and user password. Control is next given to element 420 to request a secure session.

The routing output queue is monitored by element 422. When a response is found, element 424 determines whether the response is a TIPTALK message. If no, element 430 determines whether the session open or sign-on process has been completed. If not, control is given to element 422 to await the next response. If element 430 determines that the sign-on process is complete, control is given to element 434 for setting up the requested session and linking it to the user-id/user password. The routine exits at element 440 for processing of the session.

When element 424 determines that the response is a TIPTALK message, control is given to element 426 to it it is a user-id/user password message. If yes, element 432 checks whether the information has been previously submitted. If yes, control is given to element 438 for transmission of an error message.

If element 432 determines that the message has not been previously submitted, control is given to element 436 for submission of the user-id/user password from Window 400. Control is then transferred to element 422 to await the next response.

When element 426 determines that the received message is not an enter user-id/user password message, it might be an error. Element 428 determines whether the message requires a corresponding diagnostic error message. If yes, control is given to element 438 for the transmission of an error message. If no, error message is needed, control is given to element 422 to await the next received information.

Figure 6:
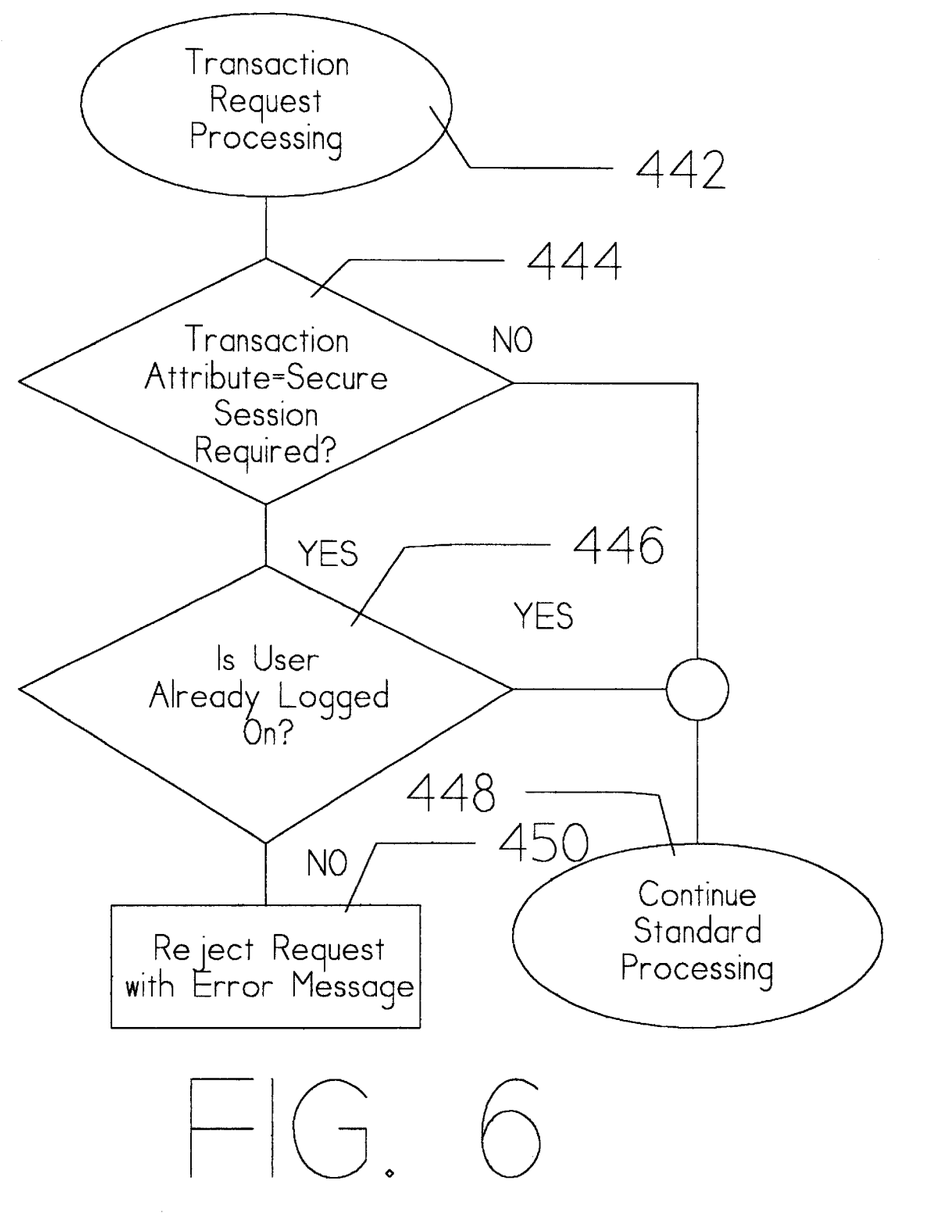
FIG. 6 is a flow chart of the transaction processing of the present invention.

FIG. 6 is a flow chart for processing an individual transaction within a previously established session. This logic is added to permit the web browser user to process a series of related transactions within the OLTP enterprise server application.

Entry to the security check and ultimately the OLTP enterprise server function is via element 442. Element 444 checks to see if there are security requirements for the requested transaction. If no, control is released via element 448 to process the transaction.

If element 444 determines that the transaction requires a secure session, control is given to element 446 to ascertain whether the user is properly logged on. If yes, exit via element 448 permits processing of the requested transaction. If no, element 450 transmits an error message.

Figure 7:
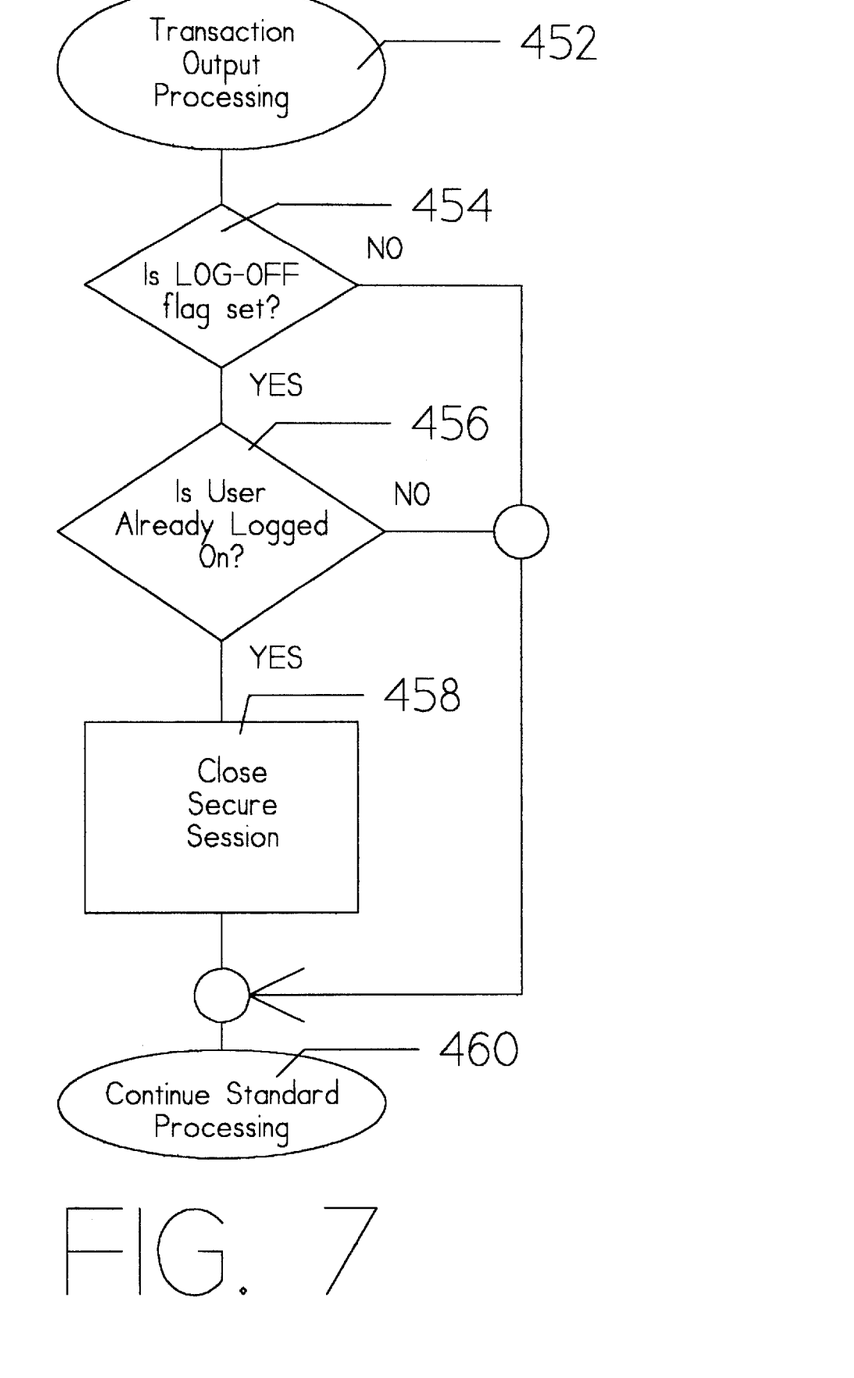
FIG. 7 is a flow chart of the transaction output processing of the present invention.

FIG. 7 is a flow chart showing the operation of output processing in accordance with the present invention. Entrance is via element 452. Element 454 determines if the user is requesting a log off. If no, control is given to element 460 to continue to process the transaction. If yes, control is given to element 456 to determine whether the user is currently logged on to a secure session.

If this is not a secure session, element 456 gives control to element 460 to complete the transaction. If yes, element 458 closes the secure session. Element 460 continues standard processing.

FIG. 8 is a listing of the script utilized by the preferred embodiment of the present invention to enable the user to log-on.

Having thus described the preferred embodiments of the present invention, those of skill in the art will readily appreciate that the teachings found herein may be applied to yet other embodiments within the scope of the claims hereto attached.

We claim:

1. A data processing system having an OLTP enterprise server with an application employing a first security technique coupled to a user terminal operating within a web browser environment employing a second security technique which is incompatible with said first security technique capable of transmitting user information, the improvement comprising:

a security facility coupled to said application and said user terminal which receives said user security information and enables said application to securely communicate with said user terminal in accordance with said first security technique if and only if said user information is valid;

wherein said security facility enables said secure communication for a transaction session, and;

wherein said security facility disables said secure communication after the completion of said transaction session.

2. A data processing system according to claim 1 wherein said user security information comprises a user-id.

3. A data processing system according to claim 2 wherein said user security information further comprises a password.

4. An apparatus comprising:
   a. an OLTP enterprise server employing a first security protocol;
   b. an application resident in said OLTP enterprise server;
   c. a user terminal operating within a web browser environment employing a second incompatible security protocol responsively coupled to said OLTP enterprise server;
   d. user security information transferable from said user terminal to said OLTP enterprise server;
   e. a security facility resident within said OLTP enterprise server which receives said user security information and permits secure access to said application if said user security information is valid and denies access to said application if said user security information is invalid;
      wherein said secure access to said application comprises access for a transaction session.

5. An apparatus according to claim 4 wherein said user security information comprises a user-id.

6. An apparatus according to claim 5. wherein said user security information further comprises a user password.

7. An apparatus according to claim 6 wherein said user-id is unique.

8. An apparatus comprising:
   a. means for providing OLTP enterprise service employing a first security technique;
   b. means located within said providing means for processing application transactions;
   c. means responsively coupled to said providing means for offering a user access to said providing means within a web browser environment employing a second and incompatible security technique;
   d. means for indicating identity of said user which is transferable from said offering means to said providing means; and
   e. means within said providing means and responsively coupled to said offering means for enabling said offering means to securely access said processing means if it determines that said indicating means is valid and for denying said offering means access to said processing means if it determines that said indicating means is not valid in accordance with said first security technique;
      wherein said enabling means further comprises means for sustaining said enabling for a transaction session.

9. An apparatus according to claim 8 wherein said identity indicating means further comprises a user-id.

10. An apparatus according to claim 9 wherein said identity indicating means further comprises a user password.

11. An apparatus according to claim 10 wherein said identity indicating means further comprises a project password.

12. A method comprising:
a. activating a web browser employing a first security approach within a user terminal;
b. securely accessing an OLTP enterprise server employing a second and incompatible security approach via said user terminal via said web browser;
c. transferring user security information from said user terminal to said OLTP enterprise server;
d. determining whether said user security information is valid; and
e. providing secure access to a secure application within said OLTP enterprise server via said user terminal if and only if said user information is valid in accordance with said second security approach;
wherein secure access to said secure application is within a transaction session.

13. A method according to claim 12 wherein said user information further comprises a user-id.

14. A method according to claim 13 wherein said user security information further comprises a user password.

15. A method according to claim 14 wherein said user-id is unique.

* * * * *